United States Patent
Liu et al.

(10) Patent No.: US 10,381,648 B2
(45) Date of Patent: Aug. 13, 2019

(54) POLYIMIDE COATED LITHIUM TITANATE PARTICLES AND USE THEREOF IN A LITHIUM ION BATTERY

(71) Applicant: E. I. DU PONT DE NEMOURS AND COMPANY, Wilmington, DE (US)

(72) Inventors: Hansan Liu, Hockessin (DE); Xiaoping Lin, Hockessin (DE)

(73) Assignee: Talostech LLC, Hockessin, DE (US)

(*) Notice: Subject to any disclaimer, the term of this patent is extended or adjusted under 35 U.S.C. 154(b) by 109 days.

(21) Appl. No.: 15/102,202

(22) PCT Filed: Dec. 5, 2014

(86) PCT No.: PCT/US2014/068762
§ 371 (c)(1),
(2) Date: Jun. 6, 2016

(87) PCT Pub. No.: WO2015/085157
PCT Pub. Date: Jun. 11, 2015

(65) Prior Publication Data
US 2016/0308217 A1    Oct. 20, 2016

Related U.S. Application Data

(60) Provisional application No. 61/912,577, filed on Dec. 6, 2013.

(51) Int. Cl.
*H01M 4/62* (2006.01)
*H01M 10/0525* (2010.01)
(Continued)

(52) U.S. Cl.
CPC .......... *H01M 4/628* (2013.01); *C01G 23/005* (2013.01); *C09C 1/3661* (2013.01); *H01M 4/366* (2013.01);
(Continued)

(58) Field of Classification Search
CPC ...... H01M 4/628; H01M 4/485; H01M 4/625; H01M 4/623; H01M 10/0525
See application file for complete search history.

(56) References Cited

U.S. PATENT DOCUMENTS 6,680,145 B2    1/2004  Obrovac et al.
6,964,828 B2    11/2005  Lu et al.
(Continued)

FOREIGN PATENT DOCUMENTS

EP    2 677 574 A1    12/2013
WO    2012/111546 A1    8/2012

OTHER PUBLICATIONS

Bryant, R. G., "Polyimides," Encyclopedia of Polymer Science and Technology, 2006, pp. 1-32, John Wiley & Sons, Inc.
(Continued)

*Primary Examiner* — Stewart A Fraser
*Assistant Examiner* — Rachel L Zhang
(74) *Attorney, Agent, or Firm* — Stinson LLP

(57) ABSTRACT

A coated particle comprising a lithium titanate particle core encased by a polyimide coating, an electrode comprising a plurality of polyimide coated LTO particles an electro-active material, and a lithium ion battery comprising an anode, a cathode, a separator and electrolyte wherein the anode comprises a plurality of polyimide coated LTO particles. The polyimide coating effectively reduces the amount of gas formation typically encountered with use of lithium titanate in electrochemical cells.

20 Claims, 5 Drawing Sheets

(51) Int. Cl.
*H01M 4/485* (2010.01)
*C01G 23/00* (2006.01)
*C09C 1/36* (2006.01)
*H01M 4/36* (2006.01)
*H01M 10/42* (2006.01)

(52) U.S. Cl.
CPC ............ *H01M 4/485* (2013.01); *H01M 4/62* (2013.01); *H01M 4/623* (2013.01); *H01M 4/625* (2013.01); *H01M 10/0525* (2013.01); *H01M 10/4235* (2013.01); *C01P 2004/03* (2013.01); *C01P 2004/04* (2013.01); *C01P 2004/61* (2013.01); *C01P 2004/84* (2013.01); *C01P 2006/40* (2013.01)

(56) References Cited

U.S. PATENT DOCUMENTS

| | | | |
|---|---|---|---|
| 7,078,128 | B2 | 7/2006 | Lu et al. |
| 7,303,840 | B2 | 12/2007 | Thackeray et al. |
| 7,468,223 | B2 | 12/2008 | Thackeray et al. |
| 7,718,319 | B2 | 5/2010 | Manthiram et al. |
| 9,142,820 | B2 * | 9/2015 | Kim .................... H01M 2/1686 |
| 2010/0092846 | A1 * | 4/2010 | Inagaki ................. H01M 4/131 429/92 |
| 2012/0149852 | A1 | 6/2012 | Dennes et al. |
| 2012/0231333 | A1 * | 9/2012 | Nakayawa ............ H01M 4/131 429/211 |
| 2012/0244439 | A1 | 9/2012 | Yu et al. |
| 2013/0260020 | A1 | 10/2013 | Tomikawa et al. |
| 2013/0273254 | A1 | 10/2013 | Hsu et al. |
| 2013/0274394 | A1 * | 10/2013 | Ju ............................ C08J 5/18 524/265 |
| 2013/0337315 | A1 * | 12/2013 | Yamamoto ............ H01M 4/131 429/163 |

OTHER PUBLICATIONS

He, Y.-B., et al., "Carbon Coating to Suppress the Reduction Decomposition of Electrolyte on the Li4Ti5O12 Electrode," Journal of Power Sources, 2012, pp. 253-261, vol. 202.

Lu, Q., et al., "A Polyimide Ion-conductive Protection Layer to Suppress Side Reactions on Li4Ti5O12 Electrodes at Elevated Temperature," RSC Advances, 2014, pp. 10280-10283, vol. 4, Issue 20.

Xu, K., "Nonaqueous Liquid Electrolytes for Lithium-Based Rechargeable Batteries," Chemical Reviews, 2004, pp. 4303-4417, vol. 104, No. 10.

Zhang, S. S., "A Review on Electrolyte Additives for Lithium-Ion Batteries," Journal of Power Sources, 2006, pp. 1379-1394, vol. 162.

* cited by examiner

POLYIMIDE COATED LITHIUM TITANATE PARTICLES AND USE THEREOF IN A LITHIUM ION BATTERY

TECHNICAL FIELD

A coated particle comprising a lithium titanate particle core encased by a polyimide coating, an electrode comprising a plurality of such coated particles as the electro-active material, and a lithium ion battery comprising an electrode comprised of polyimide coated lithium titanate particles.

BACKGROUND

Lithium ion batteries (LIB) are becoming increasingly important as energy storage devices and improvements are being aggressively pursued.

Carbon is presently the most common anode material for lithium ion batteries, but replacement of carbon with spinel lithium titanate ($Li_4Ti_5O_{12}$, also referred to as LTO) is being actively investigated due to its many favorable features such as of fast charge-discharge, good safety and long lifetime. However, the commercial success of LIB with LTO is limited in large part because of gas generation during operation, especially at high temperatures (>45° C.). The gassing causes increased internal pressure, swelling of pouch-cells, increased impedance, degradation of performance and even safety failure of batteries.

There is still demand however for a LTO based battery without gassing problems.

SUMMARY

In one aspect, there is provided a coated particle comprising a lithium titanate particle core encased by a polyimide coating. The weight percent of polyimide coating is in the range of 0.1% to 5% based on the total weight of polyimide coated particle.

In another aspect, there is provided an electrode comprising a plurality of polyimide coated LTO particles as an electro-active material.

In yet another aspect, there is provided a lithium ion battery comprising an anode, a cathode, a separator and electrolyte wherein the anode comprises a plurality of polyimide coated LTO particles.

The polyimide coating effectively reduces the amount of gassing which would otherwise be encountered with lithium titanate in electrochemical cells such as lithium ion batteries.

DESCRIPTION OF EMBODIMENTS

Figure 1A:
FIG. 1A is a photograph of LTO powder from example 1 before polyimide coating.

"Lithium ion battery" refers to a type of rechargeable battery in which lithium ions move from the anode to the cathode during discharge, and from the cathode to the anode during charge.

"Anode" refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

"Cathode" refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The coated particle prescribed herein comprises a lithium titanate particle as the core which is encased by a polyimide coating. Lithium titanate, which is abbreviated herein as 'LTO', refers to $Li_4Ti_5O_{12}$ and modified forms thereof. In general, all forms of LTO will have a spinel structure. Modified forms of LTO include 'doping' where one or more metals are substituted for some of the lithium and/or titanium atoms within the spinel structure. Modified forms of LTO also include chemical modification of the LTO particle surface (prior to polyimide coating). The LTO, if modified, will retain useful or enhanced properties for use as an electro-active material. In one embodiment, the lithium titanate is unmodified $Li_4Ti_5O_{12}$. In another embodiment the LTO particle surface is modified with $Al_2O_3$. In still another embodiment, the LTO particle surface is modified with manganese oxide.

Preparation of lithium titanate and commercial sources thereof are well known to those skilled in the art. Commercial sources of LTO include, for example, LT-105, LT-106 and LT-017 from Ishihara Sangyo Kaisha, LTD, Tokyo, Japan.

The size of the uncoated LTO particles can be any size suitable for use in lithium ion batteries. Typically, however, the LTO particles will have a volume median particle size (D50) in the range of 0.1 µm to 100 µm as measured by standard laser diffraction methods. The polyimide coating is thin and typically does not increase the particle size substantially. Therefore, a powder consisting of, or consisting essentially of, a plurality of polyimide coated LTO particles will have a particle size distribution about the same as or at most only slightly larger than the starting LTO and will likewise have a volume median particle size in the range of 0.1 µm to 100 µm.

The weight percent of polyimide coating is typically between 0.1% and 5% based on the total weight of coated LTO particle. In some embodiments, the polyimide coating is in the range of 0.2 wt % to 3 wt % based on the total weight of coated LTO particle. In other embodiments, the polyimide coating is in the range of 0.3 wt % to 2.0 wt % based on the total weight of coated LTO particle. In one embodiment, the weight percent of polyimide coating is an effective amount to reduce gassing of the LTO without severe loss of capacity. An effective amount of polyimide coating reduces gassing by at least 50% and more preferably at least 70% on a volume basis compared to the amount of gas formed by the same LTO without the polyimide coating. Preferably an effective amount of polyimide coating will cause no more than 15% loss of capacity, preferably no more than 10% loss of capacity and even more preferably no more than 5% loss of capacity compared to the same LTO without polyimide coating. It will be appreciated that the effective amount of polyimide coating can vary depending on the characteristics of the starting LTO, for example particle size and surface area.

The polyimide is not limited and can be any suitable polyimide composition. The method of forming the polyimide coating is not limited, but will typically comprise coating the LTO with polyamic acid ("precursor") composition and curing (or "imidizing") the polyamic acid to polyimide. The terms "precursor" or "polyamic acid" are used interchangeably and are intended to mean a relatively low molecular weight polyamic acid solution. The solution can be in any fluid form, such as a slurry, dispersion, or solution. The precursor solution can comprise a solvent which can be any solvent that is inert to the polyamic acid, but is typically the solvent used in the preparation of the polyamic acid. Imidization of the polymic acid can be accomplished, for example, by dehydration at elevated temperature according to methods well known in the art.

Polyamic acid is the reaction product of a tetracarboxylic acid dianhydride and an organic diamine. In one embodiment the dianhydride is aromatic, in another embodiment the diamine is aromatic, and in another embodiment both the dianhydride and the diamine are aromatic.

The polyamic acids can be prepared by any suitable method, such as those discussed in Polyimides (Encyclopedia of Polymer Science and Technology, R G Bryant, 2006, DOI: 10.1002/0471440264.pst272.pub2, John Wiley & Sons, Inc.). One method includes dissolving the diamine in a dry solvent and slowly adding the dianhydride under conditions of agitation and controlled temperature, and in a dry atmosphere, such as nitrogen.

Suitable organic dianhydrides include, but are not limited to, pyromellitic dianhydride (PMDA); biphenyltetracarboxylic dianhydride (BPDA); 3,3',4,4'-benzophenone tetracarboxylic dianhydride (BTDA); 2,3,6,7-naphthalene tetracarboxylic dianhydride; 3,3',4,4'-tetracarboxybiphenyl dianhydride; 1,2,5,6-tetracarboxynaphthalene dianhydride; 2,2',3,3'-tetracarboxybiphenyl dianhydride; 2,2-bis(3,4-dicarboxyphenyl) propane dianhydride; bis(3,4-dicarboxyphenyl) sulfone dianhydride; bis(3,4-dicarboxyphenyl) ether dianhydride; naphthalene-1,2,4,5-tetracarboxylic dianhydride; naphthalene-1,4,5,8-tetracarboxylic dianhydride; pyrazine-2,3,5,6-tetracarboxylic dianhydride; 2,2-bis(2,3-dicarboxyphenyl) propane dianhydride; 1,1-bis(2,3-dicarboxyphenyl) ethane dianhydride; 1,11-bis(3,4-dicarboxyphenyl) ethane dianhydride; bis(2,3-dicarboxyphenyl) methane dianhydride; bis(3,4-dicarboxyphenyl) methane dianhydride; benzene-1,2,3,4-tetracarboxylic dianhydride; 3,4,3',4'-tetracarboxybenzophenone dianhydride; perylene-3,4,9,10-tetracarboxylic dianhydride; bis-(3,4-dicarboxyphenyl) ether tetracarboxylic dianhydride; 4,4'-oxydiphthalic anhydrid; 3,3',4,4'-diphenyl sulfone tetracarboxylic dianhydride; 2,2-bis(3,4-dicarboxyphenyl) hexafluoropropane; Bisphenol A dianhydride (4,4'-(4,4'-isopropylidenediphenoxy)bis(phthalic anhydride)); and mixtures thereof. In one embodiment the organic dianhydrides is pyromellitic dianhydride, 3,3',4,4'-biphenyl tetracarboxylic dianhydride, 3,3',4,4'-benzophenone tetracarboxylic dianhydride, 4,4'-oxydiphthalic anhydride, 3,3',4,4'-diphenyl sulfone tetracarboxylic dianhydride, 2,2-bis(3,4-dicarboxyphenyl) hexafluoropropane, Bisphenol A dianhydride, or mixtures thereof.

Suitable organic diamines include, but are not limited to, oxydianiline (ODA), 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine, 1,3-bis(4-aminophenoxy)benzene (RODA), and 1,4 phenylenediamine (PDA); m-phenylenediamine; p-phenylenediamine; 4,4'-diaminodiphenyl propane; 4,4'-diaminodiphenyl methane benzidine; 4,4'-diaminodiphenyl sulfide; 4,4'-diaminodiphenyl sulfone; 4,4'-diaminodiphenyl ether; 1,5-diaminonaphthalene; 3,3'-dimethyl benzidine; 3,3'-dimethoxy benzidine; bis-(para-beta-amino-t-butylphenyl)ether; 1-isopropyl-2,4-m-phenylenediamine; m-xylylenediamine; p-xylylenediamine; di(paraminocyclohexyl) methane; hexamenthylenediamine; heptamethylenediamine; octamethylenediamine; decamethylenediamine; nonamethylenediamine; 4,4-dimethylheptamethyienedia-2,11-diaminododecane; 1,2-bis(3-aminopropoxyethane); 2,2-dimethylpropylenediamine; 3-methoxyhexamethylenediamine; 2,5-dimethyl hexamethylenediamine; 3-methylheptamethylenediamine; piperazine; 1,4-diamino cyclohexane; 1,12-diamino octadecane; 2,5-diamino-1,3,4-thiadiazole; 2,6-diaminoanthraquinone; 9,9'-bis(4-aminophenyl fluorene); p,p'-4,4 bis(aminophenoxy); 5.5'-diamino-2,2'-bipyridylsuifide; 2,4-diaminoisopropyl benzene; 1,3-diaminobenzene (MPD); 2,2'-bis(trifluoromethyl) benzidene; 4,4'-diaminobiphenyl; 4,4'-diaminodiphenyl sulfide; 9,9'-bis(4-amino)fluorine; and mixtures thereof. In one embodiment the organic diamine is 3,4'-oxydianiline, 1,3-bis-(4-aminophenoxy) benzene, 4,4'-oxydianiline, 1,4-diaminobenzene, 1,3-diaminobenzene, 2,2'-bis(trifluoromethyl) benzidene, 4,4'-diaminobiphenyl, 4,4'-diaminodiphenyl sulfide, 9,9'-bis(4-amino)fluorine or mixtures thereof.

In one embodiment the aromatic dianhydride is pyromellitic dianhydride (PMDA), and the aromatic diamine is oxydianiline (ODA).

Any suitable aprotic polar solvent can be used in the synthesis of polyamic acid. Exemplary solvents for polyamic acid include N,N-dimethylformamide, N,N-dimethylacetamide (DMAC), N,N-diethylformamide (DMF), N,N-diethylacetamide, N,N-dimethylmethoxyacetamide, N-methyl-2-pyrrolidone, N-methylcaprolactam, and the like.

Polyimide precursor is readily available from commercial sources well known to those skilled in the art, for example, HD MicroSystems, Parlin, N.J.

The LTO can be coated with precursor by any suitable coating process. Such processes are well known to those skilled in the art. Generally, a solution of polyimide precursor (polyamic acid) in suitable solvent is applied to the LTO particles so that the surface of the particles is evenly and completely coated with the polyamic acid solution. The solvent is then removed and the dried particles are heated to convert (cure) the polyamic acid to polyimide. The presence of polyimide on the surface of the LTO can be detected by standard techniques such as infrared spectroscopy.

In one embodiment, a coated particle of LTO is coated with polyimide which comprises, consists essentially of, or consists of monomers pyromellitic dianhydride and oxydianiline.

The coated LTO is advantageous as an electro-active material and can be formed into an electrode according to methods well known in the art. Electrode ingredients typically include the electro-active material, such as coated LTO according to this invention, a conductive agent and a binder. Commonly, the electrode ingredients are mixed with solvent and formed into a paste which is cast onto a current collector. The solvent is then removed and the dried electrode is formed into the desired size and shape. The electrode may further comprise other ingredients known in the art.

The conductive agent provides conductivity to the electrode and may be any one of various materials that do not cause any deleterious effects and that conduct electrons. Examples of the conductive agent include a carbonaceous material, such as natural graphite, artificial graphite, flaky graphite, carbon black, acetylene black, ketjen black, denka black, carbon fiber, carbon nanotube or graphene; a metallic material, such as copper powder or fiber, nickel powder or fiber, aluminum powder or fiber, or silver powder or fiber; a conductive polymer such as a polyphenylene derivative, and mixtures thereof.

The binder may allow active material particles to be attached to each other and the electro-active material to be attached to a current collector. Non-limiting examples of the binder include polyvinylalcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and a mixture thereof. For example, the binder may be polyvinylidene fluoride (PVDF). The binder will typically be present in an amount of from 5 wt % to 10 wt % based on the weight of electro-active material.

The solvent used to make the electrode paste can be any one of various solvents commonly used for such purpose. Examples of the solvent include a chain carbonate such as dimethyl carbonate, ethyl methyl carbonate, diethyl carbonate or dipropyl carbonate, a cyclic carbonate such as ethylene carbonate, propylene carbonate or butylene carbonate, dimethoxyethane, diethoxyethane, a fatty acid ester derivative, gamma-butyrolactone, N-methylpyrrolidone (NMP), acetone, or water. The solvent may also be a combination of two or more of these.

The "current collector" refers to a structural part of an electrode assembly whose primary purpose is to conduct electricity between the actual working part of the electrode, and the terminals of an electrochemical cell. The current collector material may be any one of various materials commonly used in the art, for example, a copper foil or an aluminum foil, but is not limited thereto.

An electrode comprising coated LTO is advantageous for use in an electrochemical cell. In some embodiments, the electrochemical cell is a lithium battery. In some embodiments, the lithium ion battery comprises an anode, a cathode, a separator between the cathode and anode, an electrolyte, and a housing to enclose the battery.

As prescribed herein, the anode is an electrode comprising polyimide coated LTO. The cathode, is an electrode comprising suitable cathode-active material. The cathode-active material is any suitable electro-active material which can be advantageously paired with the polyimide coated LTO anode. The electrode comprising suitable cathode-active material can be formed in the same way as described herein before.

Suitable electro-active cathode materials include electro-active transition metal oxides comprising lithium, such as $LiCoO_2$, $LiNiO_2$, $LiMn_2O_4$, or $LiV_3O_8$; oxides of layered structure such as $LiNi_xMn_yCo_zO_2$ where x+y+z is about 1, $LiCo_{0.2}Ni_{0.2}O_2$,$Li_{1+z}Ni_{1-x-y}Co_xAl_yO_2$ where 0<x<0.3, 0<y<0.1, olivine structured $LiFePO_4$, $LiMnPO_4$, $LiCoPO_4$, and $LiVPO_4F$; spinel structured $LiNi_{0.5}Mn_{1.5}O_4$; mixed metal oxides of cobalt, manganese, and nickel such as those described in U.S. Pat. No. 6,964,828 and U.S. Pat. No. 7,078,128; nanocomposite cathode compositions such as those described in U.S. Pat. No. 6,680,145; lithium-rich layered-layered composite cathodes such as those described in U.S. Pat. No. 7,468,223; and cathodes such as those described in U.S. Pat. No. 7,718,319 and the references therein.

Another suitable electro-active material is a lithium-containing manganese composite oxide having a spinel structure as an electro-active cathode material. A lithium-containing manganese composite oxide suitable for use herein comprises oxides of the formula $Li_xNi_yM_z$ $Mn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

Other suitable electro-active include layered oxides such as $LiCoO_2$ or $LiNi_xMn_yCo_zO_2$ where x+y+z is about 1, that can be charged to cathode potentials higher than the standard 4.1 to 4.25 V range in order to access higher capacity. Other examples are layered-layered high-capacity oxygen-release cathodes such as those described in U.S. Pat. No. 7,468,223 charged to upper charging voltages above 4.5 V.

The separator is porous and serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. Patent Application Publication No. 2012/0149852.

"Electrolyte composition" as used herein, refers to a chemical composition suitable for use as an electrolyte in an electrochemical cell. An electrolyte composition typically comprises at least one solvent and at least one electrolyte salt.

"Electrolyte salt" as used herein, refers to an ionic salt that is at least partially soluble in the solvent of the electrolyte composition and that at least partially dissociates into ions in the solvent of the electrolyte composition to form a conductive electrolyte composition.

Typically, the electrolyte solvent comprises one or more alkyl carbonates including, for example, any one or a mixture of ethylene carbonate (EC), ethyl methyl carbonate (EMC) and dimethyl carbonate (DMC).

Suitable solvents for electrolyte compositions can also include fluorinated acyclic carboxylic acid esters, represented by the formula $R^1$—COO—$R^2$, where $R^1$ and $R^2$ independently represent an alkyl group, the sum of carbon atoms in $R^1$ and $R^2$ is 2 to 7, at least two hydrogens in $R^1$ and/or $R^2$ are replaced by fluorines and neither $R^1$ nor $R^2$ contains a $FCH_2$ or FCH group. Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No.

1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), and $HCF_2$—$CH_2$—$CH_2$—COO—$CH_2CH_3$ (ethyl 4,4-difluorobutanoate, CAS No. 1240725-43-2). In one embodiment, the fluorinated acyclic carboxylic acid ester is 2,2-difluoroethyl acetate ($CH_3$—COO—$CH_2CF_2H$).

Other suitable fluorinated acyclic carbonates are represented by the formula $R^3$—OCOO—$R^4$, where $R^3$ and $R^4$ independently represent an alkyl group, the sum of carbon atoms in $R^3$ and $R^4$ is 2 to 7, at least two hydrogens in $R^3$ and/or $R^4$ are replaced by fluorines and neither $R^3$ nor $R^4$ contains a $FCH_2$ or FCH group. Examples of suitable fluorinated acyclic carbonates include without limitation $CH_3$—OC(O)O—$CH_2CF_2H$ (methyl 2,2-difluoroethyl carbonate, CAS No. 916678-13-2), $CH_3$—OC(O)O—$CH_2CF_3$ (methyl 2,2,2-trifluoroethyl carbonate, CAS No. 156783-95-8), $CH_3$—OC(O)O—$CH_2CF_2CF_2H$ (methyl 2,2,3,3-tetrafluoropropyl carbonate, CAS No.156783-98-1), $HCF_2CH_2$—OCOO—$CH_2CH_3$ (ethyl 2,2-difluoroethyl carbonate, CAS No. 916678-14-3), and $CF_3CH_2$—OCOO—$CH_2CH_3$ (ethyl 2,2,2-trifluoroethyl carbonate, CAS No. 156783-96-9).

Other suitable fluorinated acyclic ethers are represented by the formula: $R^5$—O—$R^6$, where $R^5$ and $R^6$ independently represent an alkyl group, the sum of carbon atoms in $R^5$ and $R^6$ is 2 to 7, at least two hydrogens in $R^5$ and/or $R^6$ are replaced by fluorines and neither $R^5$ nor $R^6$ contains a $FCH_2$ or FCH group. Examples of suitable fluorinated acyclic ethers include without limitation $HCF_2CF_2CH_2$—O—$CF_2CF_2H$ (CAS No. 16627-68-2) and $HCF_2CH_2$—O—$CF_2CF_2H$ (CAS No. 50807-77-7).

A mixture of two or more of these fluorinated acyclic carboxylic acid ester, fluorinated acyclic carbonate, and/or fluorinated acyclic ether solvents may also be used. Other suitable mixtures can include anhydrides. One suitable electrolyte solvent mixture includes a fluorinated acyclic carboxylic acid ester, ethylene carbonate, and maleic anhydride, such as 2,2-difluoroethey acetate, ethylene carbonate, and maleic anhydride. The electrolyte composition can comprise about 61% 2,2-difluoroethyl acetate, about 26% ethylene carbonate, and about 1% maleic anhydride by weight of the total electrolyte composition.

The electrolyte compositions described herein can also contain at least one electrolyte salt. Suitable electrolyte salts include without limitation
- lithium hexafluorophosphate ($LiPF_6$),
- lithium tris(pentafluoroethyl)trifluorophosphate ($LiPF_3(C_2F_5)_3$),
- lithium bis(trifluoromethanesulfonyl)imide,
- lithium bis(perfluoroethanesulfonyl)imide,
- lithium (fluorosulfonyl) (nonafluorobutanesulfonyl)imide,
- lithium bis(fluorosulfonyl)imide,
- lithium tetrafluoroborate,
- lithium perchlorate,
- lithium hexafluoroarsenate,
- lithium trifluoromethanesulfonate,
- lithium tris(trifluoromethanesulfonyl)methide,
- lithium bis(oxalato)borate,
- lithium difluoro(oxalato)borate,
- $Li_2B_{12}F_{12-x}H_x$ where x is equal to 0 to 8, and
- mixtures of lithium fluoride and anion receptors such as $B(OC_6F_5)_3$.

Mixtures of two or more of these or comparable electrolyte salts may also be used. A suitable electrolyte salt is lithium hexafluorophosphate. The electrolyte salt can be present in the electrolyte composition in an amount of about 0.2 to about 2.0 M, or about 0.3 to about 1.5 M, or about 0.5 to about 1.2 M.

The optimum range of salt and solvent concentrations in the electrolyte may vary according to specific materials being employed and the anticipated conditions of use, for example, according to the intended operating temperature. In one embodiment, the solvent is 20 to 40 parts by volume of ethylene carbonate and 60 to 80 parts by volume of ethyl methyl carbonate, and the salt is $LiPF_6$.

Alternatively, the electrolyte may comprise a lithium salt such as, lithium hexafluoroarsenate, lithium bis-trifluoromethyl sulfonamide, lithium bis(oxalate)boronate, lithium difluorooxalatoboronate, or the $Li^+$ salt of polyfluorinated cluster anions, or combinations of these. Alternatively, the electrolyte may comprise a solvent, such as, propylene carbonate, esters, ethers, or trimethylsilane derivatives of ethylene glycol or poly(ethylene glycols) or combinations of these. Additionally, the electrolyte may contain various additives known to enhance the performance or stability of Li-ion batteries, as reviewed for example by K. Xu in Chem. Rev., 104, 4303 (2004), and S. S. Zhang in J. Power Sources, 162, 1379 (2006).

The housing of the electrochemical cell may be any suitable container to house the electrochemical cell components described above. Such a container may be fabricated in the shape of a cylindrical battery, a rectangular battery, a coin-type battery, or a pouch-type battery; and according to a size, a bulky battery and a thin-film type battery. Methods of manufacturing the lithium secondary batteries as described above are widely known in the art.

The electrochemical cell or lithium ion battery disclosed herein may be used for grid storage or as a power source in various electronically-powered or -assisted devices ("electronic device") such as a transportation device (including a motor vehicle, automobile, truck, bus or airplane), a computer, a telecommunications device, a camera, a radio or a power tool.

EXAMPLES

It is understood that the embodiments described herein disclose only illustrative but not exhaustive examples of the invention set forth.

Materials

Poly(amic acid) was PI-2454, a 13 wt % solution comprised of pyromellitic dianhydride/oxydianiline polymer obtained from HD Microsystem Inc, Parlin, N.J., USA. N-methyl-2-pyrrolidone (NMP), anhydrous, was obtained from Sigma-Aldrich. Conductive carbon, Super C65, was obtained from Timcal Ltd, Bodio, CH. Polyvinylidene fluoride (PVDF), KF#9130, 13 wt % in NMP, was obtained from Kureha America, New York, N.Y., USA. Ethylene carbonate (EC) and ethyl methyl carbonate (EMC) were obtained from Novolyte Technologies/BASF. Lithium foil, 0.75 mm thick, was obtained from Alfa Aesar. Separator, Celgard 2500, a monolayer polypropylene film, was obtained from Celgard LLC, Charlotte, N.C., USA. Graphite powder, CPreme® G8, was obtained from ConocoPhillips Specialty Products, Inc, Houston, Tex., USA.

Lithium titanate was prepared according to methods described in co-pending U.S. patent application Ser. No. 13/910230. The BET surface area was 3.9 m²/g. The pore volume was 0.0071 mL/g. The volume median particle size, D50, was 18.39 µm, the D10 was 1.95 µm and the D90 was 34.06 µm as determined by laser diffraction techniques (Horiba LA910).

Example 1

Preparation of 1% PI Coated LTO

LTO, 20 g, and poly(amic acid), 20 g of 1.0 wt % solution of PI2454 in NMP, were combined in a wide-mouth glass jar and mixed with a planetary centrifugal mixer (Thinky ARE-310) for one minute at 2000 rpm. The mixture was then sonicated in an ultrasonic water bath for an hour at room temperature and stirred for an additional 12 hours with a magnetic stirrer at room temperature. The solvent was removed from the mixture by distillation at about 100° C. for about 60 minutes and then heating in a vacuum oven at 80° C. for 12 hours to yield poly(amic) acid coated LTO.

The poly(amic) acid coating was cured to polyimide by heating the poly(amic) acid coated LTO under inert atmosphere (argon) according to the following conditions: (1) purge with argon gas at 25° C. for one hour; (2) increase the temperature from 25° C. to 150° C. over one hour (2° C./minute); (3) hold at 150° C. for 30 minutes;(4) Increase the temperature from 150° C. to 230° C. in 40 minutes (2° C./minute); (5) hold at 230° C. for 30 minutes; (6) increase the temperature from 230° C. to 300° C. in 35 minutes (2° C./minute); (7) hold the mixture at 300° C. for 30 minutes; (8) Increase the temperature from 300° C. to 400° C. in 50 minutes (2° C./minute); (9) hold at 400° C. for 30 minutes.

The coated LTO thus obtained was calculated to have a 0.99 wt % PI coating (rounded to 1 wt % for ease of reference) based on the total weight of coated LTO. The calculation is based on the weight ratio of polyamic acid to LTO initially added and assumes substantially all of the polyamic acid is converted to polyimide.

Figure 1B:
FIG. 1B is a photograph of LTO powder from example 1 after polyimide coating

FIG. 1A shows a photograph of LTO before PI coating and FIG. 1B shows a photo of LTO after 1% PI coating. Both are free flowing powders.

Figure 2A:
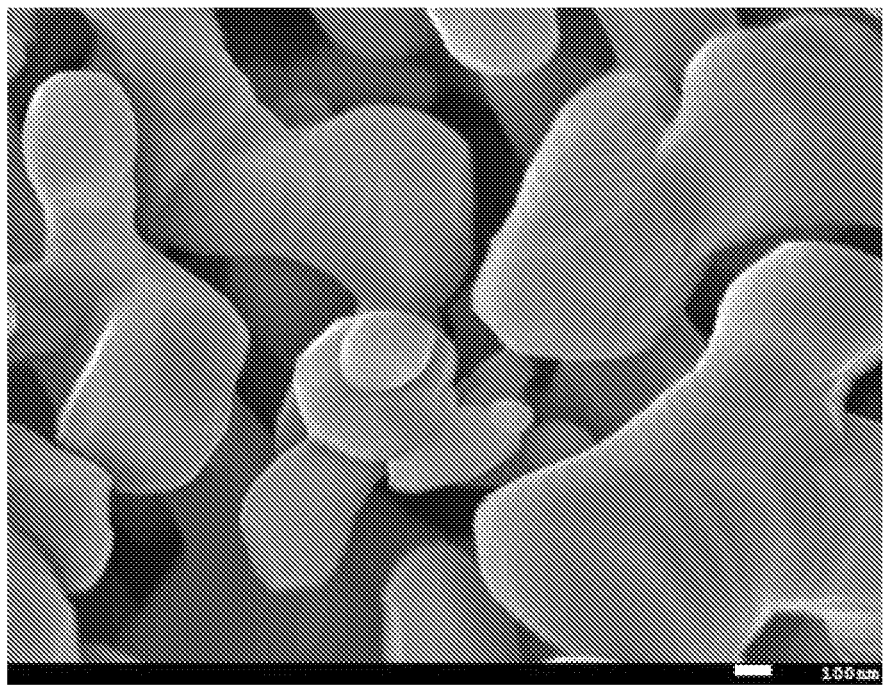
FIG. 2A is a scanning electron micrograph of LTO from example 1 before polyimide coating.
Figure 2B:
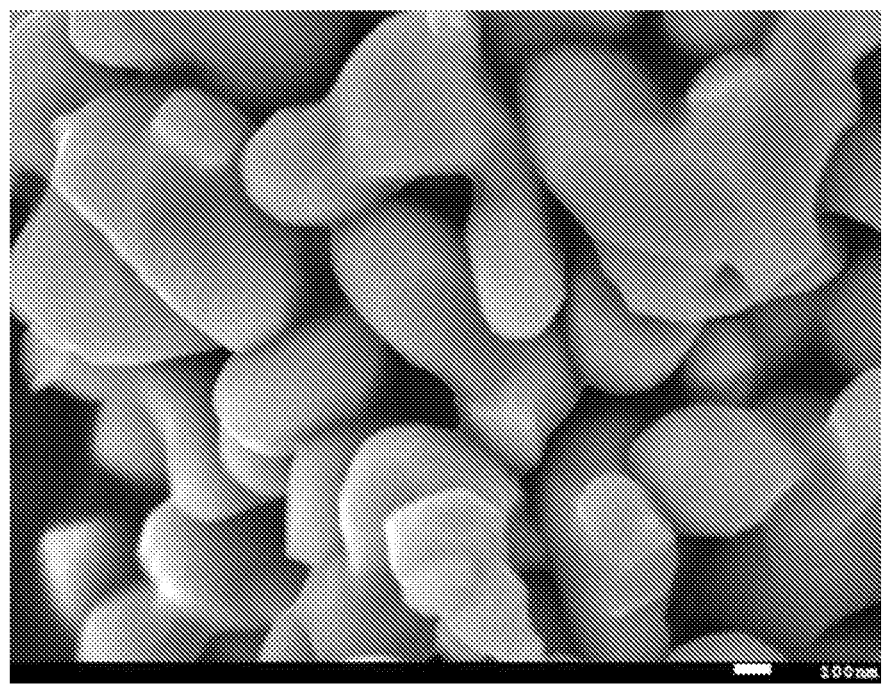
FIG. 2B is a scanning electron micrograph of LTO from example 1 after polyimide coating.

FIG. 2A shows a scanning electron micrograph (SEM) of LTO particles before PI coating and FIG. 2B shows an SEM of LTO particles after 1% PI coating.

Figure 3:
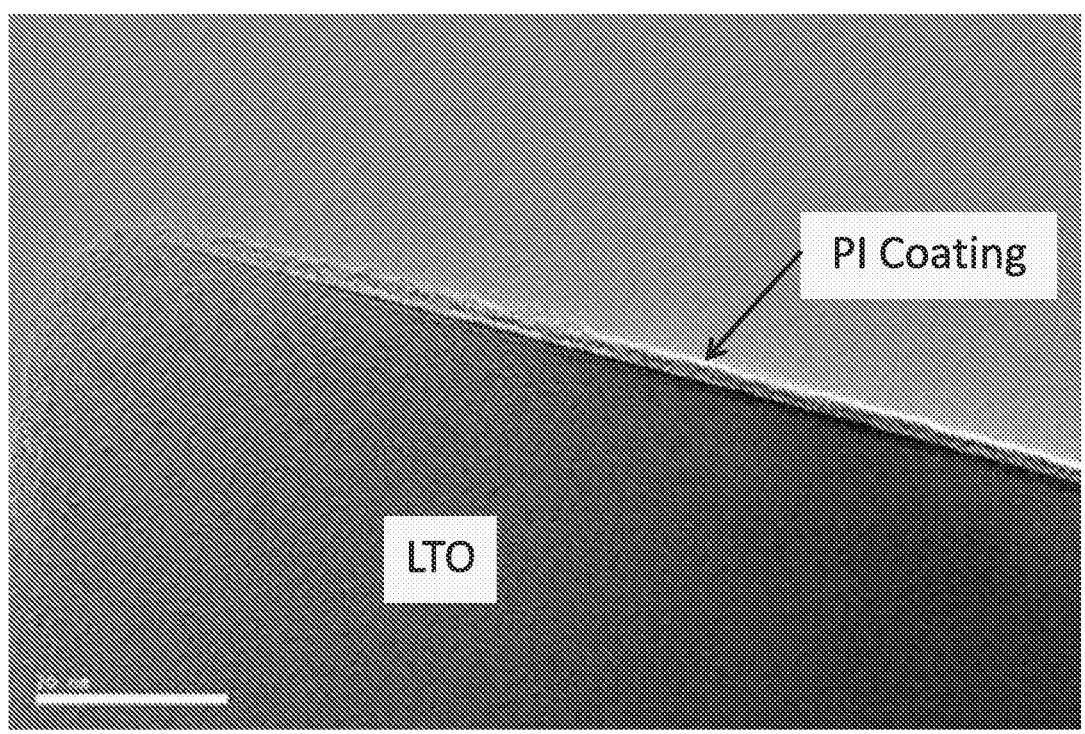
FIG. 3 is a transmission electron micrograph of a PI coated LTO in cross section.

FIG. 3 shows a transmission electron micrograph (TEM) of the 1% PI coated LTO particle in cross section where the thin layer of PI can be seen on the LTO surface.

Example 2

Preparation of 2% PI Coated LTO

A polyimide coated LTO was prepared following the same procedure as Example 1 except the 20 g of poly(amic acid) solution initially added was 2.0 wt % of poly(amic acid). The weight percent of PI was 1.96 wt % (rounded to 2 wt % for ease of reference) based on the total weight of coated LTO.

Example 3

Preparation of 3% PI Coated LTO

A polyimide coated LTO was prepared following the same procedure as Example 1 except the 20 g of poly(amic acid) solution initially added was 3.0 wt % of poly(amic acid). The final weight percent of PI coating was calculated to be 2.91 wt % (rounded to 3 wt % for ease of reference) based on the total weight of coated LTO.

Example 4

ATR Spectra of Coated LTO

Figure 4:
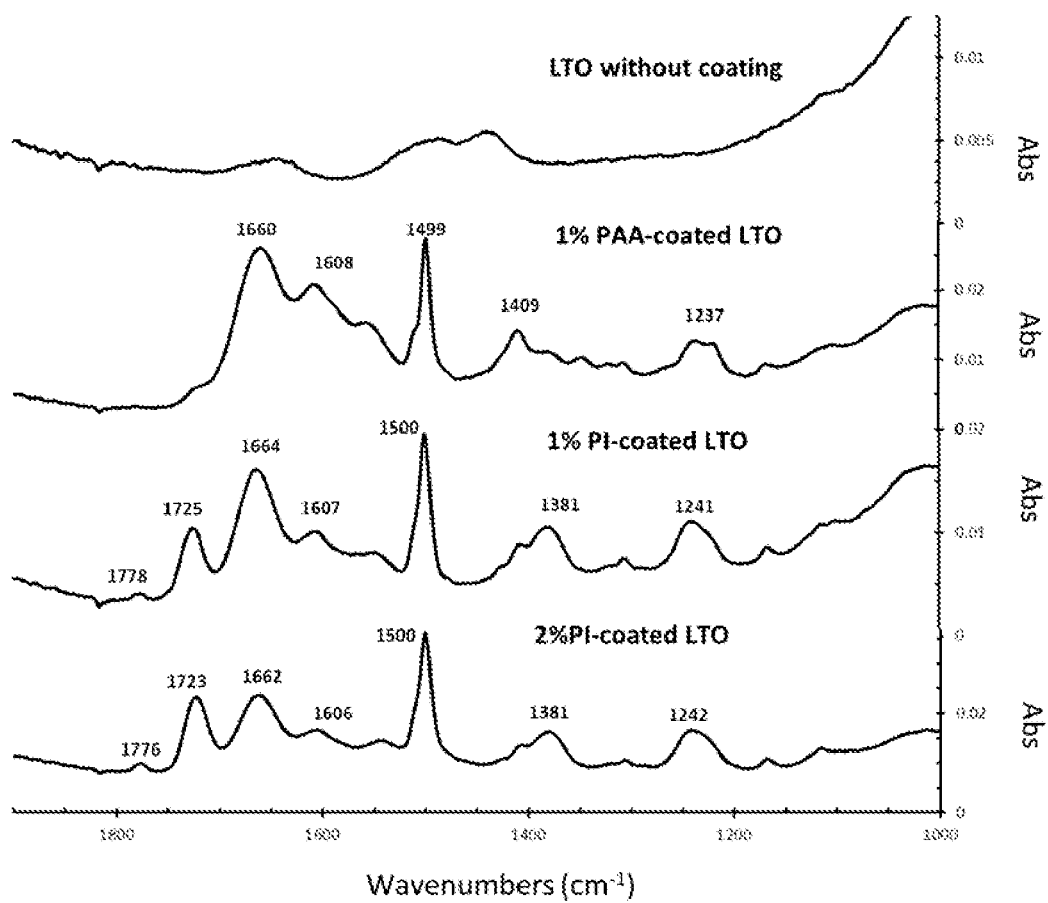
FIG. 4 shows attenuated total reflectance spectra of 2% PI coated LTO, 1% PI coated LTO, 1% PAA coated LTO and uncoated LTO.

FIG. 4 shows ATR (Attenuated Total Reflectance) spectra of 1% PI coated LTO and 2% PI coated LTO. For comparison, also shown are scans for uncoated LTO and 1% poly(amic acid) ("PAA") coated LTO before curing. The samples were run on a Nicolet 6700 FTIR (ThermoFisher Scientific) with a Golden Gate diamond ATR unit (Specac).

The major bands for polyimide are imide absorption bands near 1720 $cm^{-1}$ (C=O symmetrical stretching), 1780 $cm^{-1}$ (C=O asymmetrical stretching), and 1380 $cm^{-1}$ (C—N stretching). Other bands overlap with poly(amic acid). The results clearly confirm that coating is present on the LTO surface and that polyimide was formed after curing.

Figure 5:
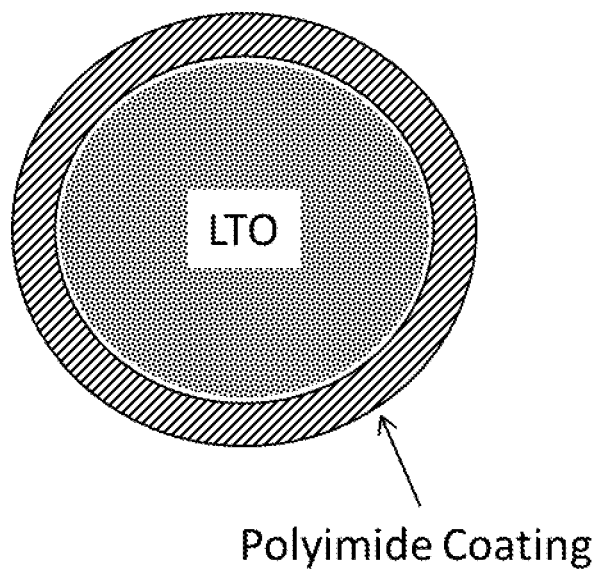
FIG. 5 depicts a cross section of a LTO particle core encased in a polyimide coating.

FIG. 5 depicts, in cross section, a LTO particle core encased in a polyimide coating. The relative thickness of the coating is not necessarily to scale.

Example 5

Electrode Preparation with PI Coated LTO

The LTO active materials and conductive carbon were dried in a vacuum oven at 120° C. for 12 hours prior to use. The active material (0.7920 g) and conductive carbon (0.0990 g) were combined in a glass vial and mixed in a Spex mixer for 30 minutes before adding NMP (1.3475 g) and PVDF solution (0.7615 g of a 13% PVDF solution in NMP) to form an electrode paste with a solid content of 33 wt % and a ratio of carbon/PVDF/active material of 10/10/80. Glass beads (6 pieces, 4 mm diameter) were added to the paste which was then thoroughly mixed in the Spex mixer, stopping periodically to limit heat build-up.

To prepare the electrode, a clean glass plate (18 cm by 13 cm) with Kapton® tape on the edges (2 cm wide, 95 µm thick), was placed on top of a vacuum hold down plate (30 cm ×23 cm). A piece of copper foil was then placed on the glass plate and held down by surface tension of a small amount of IPA put on the glass before copper film placement. The electrode paste was spread on the foil with a doctor-blade at a constant speed using the gate of 5 mils (0.005 inch, 0.125 mm) to form a film which was dried for 30 minutes at 120° C. under nitrogen flow. The film was further dried at 120° C. under vacuum for 10 hour and then allowed to cool to room temperature under vacuum. The dried film was pressed by a calendar machine (Design Prove Machine, Canada) under about 590 psi (4068 kPa) at a rotational speed of 1.25 rpm and ambient room temperature to densify the film and form the prepared electrode. In this way, an electrode with each of 1%, 2% and 3% polyimide coated LTO from Examples 1-3 was made.

Comparative Example A

Electrode Preparation with Uncoated LTO

In the same manner as Example 5, an electrode was prepared using uncoated LTO in place of the coated LTO.

Comparative Example B

Electrode Preparation with Uncoated LTO and PI Binder

Using the general procedure of Example 5, an electrode was prepared with uncoated LTO as the electro-active material and polyimide as the binder replacing PVDF. Poly(amic acid) (9.8485 g of 13% NMP solution) was mixed with LTO (2.6 g), carbon black (0.325 g, C65) and NMP (0.2265 g) to form a paste with a ratio of LTO:Carbon:PI (80:10:10). The paste was cast onto the copper foil. To cure the polyamic acid to polyimide, the electrode was then treated in a tube furnace using the same curing procedure as described in Example 1.

Example 6

Coin Cell Preparation, Capacity and Rate Performance of PI Coated LTO Electrode and Comparative Electrodes Using the prepared electrodes from example 5 and comparative examples A and B, electrode disks, 13 mm OD, were cut with a punch (HSNG-EP, Hohsen Corp.), and dried for 10 hours under vacuum at 120° C. Separator disks, 16.8 mm OD, were cut with a punch and dried in the antechamber of a glove box for 10 hours, under vacuum, at room temperature. Lithium foil disks, 15 mm OD, were cut with a punch (Elora, Germany) in an argon-filled glove box. Coin cells (size CR2320 using cell parts from Hohsen Corp) were assembled in a glove box under an argon purge using the electrode disk as the cathode, the lithium disk as the anode, the separator disk disposed between the anode and cathode disks, and 1.0M $LiPF_6$ in EC/EMC (30/70 volume basis) as electrolyte. The coin cells were finished by sealing with an auto crimper (Hohsen Corp.). Using this method, coin cells were prepared from 1% PI coated LTO ("1% PI coat"), 2% PI coated LTO ("2% PI coat") and 3% PI coated LTO ("3% PI coat") from example 4; uncoated LTO ("0% PI Coat") from comparative A; and, polyimide binder ("PI binder") from comparative B.

The coin cells thus prepared (electrode/Li half cells) were tested in a battery charger (Maccor, USA) by the following test protocol: a) rest 24 hours; b) five discharge-charge cycles in the range of 1.0 to 2.5 V for each cycle rate of 0.1 C, 1 C, 5 C and 10 C. The cycle rate "C" is the number of complete charges and discharges per hour. Thus a rate of 10 C means 5 charges and 5 discharges per hour, or in other words, 6 minutes to completely charge or discharge the cell.

The coin cell test results are summarized in Table 1. The data, shown as capacity (mAh/g), is an average of the five discharge-charge cycles at each cycle rate. In this set of tests, the capacity performance of 1% PI coating is undiminished compared to the uncoated LTO. The 2% and 3% PI coating and the PI binder show capacity loss at all cycle rates tested.

TABLE 1

| | Capacity (mAh/g) | | | | |
|---|---|---|---|---|---|
| Cycle Rate | 0% PI coat | 1% PI coat | 2% PI coat | 3% PI coat | PI binder |
| 0.1 C | 170 | 170 | 159 | 156 | 163 |
| 1 C | 162 | 162 | 146 | 138 | 157 |
| 5 C | 119 | 122 | 103 | 88 | 101 |
| 10 C | 90 | 90 | 71 | 60 | 70 |

Example 7

Cylindrical Large Cell with 1% PI Coated LTO Anode

To determine the effect of polyimide coating on gas generation in LTO batteries, a cylindrical large cell (nominal 1000 mAh) equipped with pressure monitor was designed and used. Lithium iron phosphate (LFP) cathode was used as counter electrode, due to its excellent stability and non-gassing feature.

For the anode, 1% polyimide coated LTO from Example 1 (12.6720 g) and conductive carbon (1.5840 g) were mixed evenly in 4 glass vials (20 mL size) by a Spex mixer for 30 minutes before adding NMP (26.3594 g) and PVDF solution (12.1846 g, 13% in NMP) to form the anode paste with a solid content of 30 wt % and a ratio of carbon:PVDF:LTO (10:10:80).

For the cathode, LFP material (16.0 g) and conductive carbon (2.0 g) were mixed evenly in 4 glass vials (20 mL size) by a Spex mixer for 30 minutes before adding NMP (40.693 g) and PVDF solution (15.3858 g) to form the cathode paste with a solid content of 27 wt % and a ratio of carbon:PVDF:LFP (10:10:80).

Glass beads (6 pieces for each vial, diameter 4 mm) were added to each of the pastes which were then thoroughly mixed in the Spex mixer for 1 hour, stopping periodically (every 15 minutes) to prevent the paste from getting too warm.

The electrodes were prepared from the pastes as follows. A clean glass plate (27 cm by 19 cm) was placed on the top of vacuum plate (30 cm by 23 cm). A piece of copper foil was placed on the glass plate. The anode or cathode paste was spread on the foil with a doctor-blade at a constant speed using the gate of 10 mils (0.250 mm) to form a film and the film was dried at 120° C. under nitrogen flow for 30 minutes. The film was further dried at 120° C. under vacuum for 10 hours and then allowed to cool to room temperature under vacuum. The prepared electrodes were pressed by a calendar machine (Design Prove Machine, Canada) under about 590 psi (4068 kPa) as described in example 5. The electrodes were cut into a size of 20 cm by 5 cm with a taper of 2 cm by 3 cm on the edge for cell assembly. The areal density of active material LTO on the electrode is about 6.0 mg/cm$^2$; the areal density of LFP is about 6.5 mg/cm$^2$.

The full cell was made by stacking separator-anode-separator-cathode for four times to get a total active electrode area of 800 cm$^2$, and then rolled into the cylindrical cell. Electrolyte (30 g, 1M $LiPF_6$ in EC/EMC (30/70)) was added to completely wet the electrode. The cell was sealed and attached with a pressure sensor to monitor pressure change and a vessel to sample gases for analysis.

Example 8

Cylindrical Large Cell with 2% PI coated LTO Anode

Using the method of Example 7 and the polyimide coated LTO from Example 2, a cylindrical large cell was prepared with 2% polyimide coated LTO as the anode.

Comparative Example C

Cylindrical Large Cell with Graphite Anode

In order to compare gas generation from graphite based batteries, a graphite/LFP cylindrical large cell was made according to the method of Example 6 using an ingredients weight ratio of graphite:carbon black:PVDF equal to 88:2:10. The active material areal density was 6.05 mg/cm$^2$. To match the capacity of this anode, a LFP electrode was made with an areal density of 12.5 mg/cm$^2$.

Comparative Example D

Cylindrical Large Cell with Uncoated LTO Anode

Using the method of Example 7 and uncoated LTO in place of the coated LTO, a cylindrical large cell was prepared with uncoated LTO as the anode.

Comparative Example E

Cylindrical Large Cell with Uncoated LTO and Polyimde Binder

A cylindrical large cell was prepared using the method of Example 7 except the uncoated LTO electrode with polyimide binder from Examples B was used as the anode.

Example 9

Testing of Cylindrical Large Cells

The cylindrical large cells were tested by the following procedures: open circuit voltage rest 12 hours; formation at 0.2 C, 3 cycles; rest 10 hours; cycling at 1 C, for 115 hours. During the electrochemical test, the gas generation was monitored by a pressure sensor equipped with the cell. The gas volume produced was calculated from the pressure rise assuming ideal gas behavior. Results are summarized in Table 2. Uncoated LTO in Comparative D generated a substantial amount of gas (1.27 mL per gram of electroactive material) at 100 hours compared to a typical commercial-type graphite anode (0.52 mL/g) of Comparative C. The 1% PI coating in Example 6 reduced gas generation of LTO anode to 0.52 mL/g, a level equal to graphite. At the higher 2% PI coating, gas generation was reduced even further (to 0.39 mL/g), although the capacity is also decreased.

TABLE 2

|  | Comp. C graphite | Comp. D no PI | Ex. 6 1% PI | Ex. 7 2% PI | Comp. E PI binder |
| --- | --- | --- | --- | --- | --- |
| Weight (g) of Active material | 2.13 | 6.40 | 4.85 | 4.37 | 4.37 |
| Capacity (mAh), (theoretical) | 792 | 1114 | 844 | 760 | 760 |
| Capacity (mAh) at 0.2 C | 450 | 605 | 610 | 510 | 600 |
| Capacity (mAh) at 1 C | 410 | 460 | 490 | 430 | 510 |
| Pressure (kPa) at 100 hours | 24.1 | 104.7 | 40.7 | 31.0 | 25.5 |
| Gas, mL/g active | 0.52 | 1.27 | 0.52 | 0.39 | 0.28 |

Example 10

Al$_2$O$_3$-modified LTO Coated with Polyimide

Lithium titanate modified with Al$_2$O$_3$ was prepared as follows. Sodium aluminate (615 mg) was dissolved in 160 mL of DI water and stirred to dissolve completely. Boric acid (439 mg) and citric acid (56 mg) were dissolved separately in 160 mL of DI water. Lithium titanate (25 g) was suspended in 250 mL of DI water and the temperature of the suspension was adjusted to 45° C. The solutions of sodium aluminate and boric and citric acid are added simultaneously and at equal rates, approximately 8 mL/min, while stirring. The solution was stirred for an additional 30 minutes after the addition is complete, after which the particles were separated from the liquid by vacuum filtration. The recovered particles were washed with deionized water, dried in a vacuum oven at 120° C. for 2 hr, and annealed in an oven for 5 hr at a temperature of 450° C. The treatment of LTO creates alumina on the surface of the LTO particles which are referred to as Al$_2$O$_3$-modified LTO.

The Al$_2$O$_3$-modified LTO was then coated with polyimide (1 wt % PI) as described in Example 1.

The rate performance of Al$_2$O$_3$-modified LTO before and after polyimide was tested following the same procedure as Example 6. The gassing behavior of Al$_2$O$_3$-modified LTO before and after polyimide was measured following the same procedure as Example 7 and 9. The testing results are summarized in Table 3. The polyimide coating effectively reduced gassing of Al$_2$O$_3$-modified LTO material.

Example 11

MnO$_x$-modified LTO Coated with Polyimide

MnO$_x$-modified LTO was prepared as follows. LTO, 34.648 g, and deionized water, 200 mL, were placed in a 500 mL three neck round bottom flask. The slurry was agitated at 350 rpm by overhead stirrer. KMnO$_4$(aq) (0.4M, 8.2 mL), was added to the slurry and the slurry was heated to about 60° C. Sucrose, 6 g, was added in the slurry which was kept at temperature for about 10 min under the agitation. The slurry was filtered to collect the powders. The powders, washed with deionized water, were dried under vacuum at room temperature and then further dried in an oven at 120° C. for 2h under vacuum. Finally, the dried powders were heated at 300° C. for 1h in air. The heating and cooling rates were set to 5° C. per min. "MnO$_x$" refers to a mixture of manganese oxide species. The Mn valence state was predominately 4+ and MnO$_x$ was predominately MnO$_2$. The MnO$_x$-modified LTO thus prepared had an approximately 0.74 wt % MnO$_2$ coating based on the total weight of MnO$_x$-modified LTO.

The MnO$_x$-modified LTO was then coated with polyimide (1 wt % PI) as described in Example 1.

The rate performance of MnO$_x$-modified LTO before and after polyimide coating was tested following the same procedure as Example 6. The gassing behavior of MnO$_x$-modified LTO before and after polyimide was measured following the same procedure as Example 7 and 9. The test results are summarized in Table 3. The polyimide coating reduced gassing of MnO$_x$-modified LTO material.

TABLE 3

| Example | Rate performance | | Gassing rate (ml/min) | |
|---|---|---|---|---|
| | 0.1 C (mAh/g) | 5 C (mAh/g) | Formation | Cycling |
| 10 Al$_2$O$_3$-LTO | 169 | 159 | 0.43 | 0.89 |
| 10 PI-coated Al$_2$O$_3$-LTO | 162 | 145 | 0.13 | 0.31 |
| 11 MnOx-LTO | 169 | 158 | 0.71 | 1.38 |
| 11 PI-coated MnOx-LTO | 167 | 147 | 0.54 | 1.08 |

Example 12

LTO Coated with BPDA-PPD Polyimide

Poly(amic acid) precursor solution was prepared from poly(p-phenylene biphenylenetetracarboximide) (BPDA-PPD) and coated on LTO following the procedure of Example 1. The rate performance of this BPDA-PPD coated LTO was tested following the same procedure as Example 6. The results are summarized in Table 4. Gassing tests were not run.

Example 13

LTO Coated with Phenolic-containing Fluorinated Polyimide

LTO was coated with an alcohol-soluble phenolic-containing fluorinated polyimide. The coating process was based on the procedure of Example 1 except that curing step was omitted as the coating is already imidized. After depositing the polymer onto LTO, the coated material was achieved by drying in vacuum oven for 10 hours at 120° C. and 2 hours at 150° C. The rate performance of this PI-coated LTO material was tested following the same procedure as Example 6. The gassing behavior of this PI-coated LTO material was measured following the same procedure as Example 7 and 9. The results are summarized in Table 4.

TABLE 4

| Example | Rate performance | | Gassing rate (ml/min) | |
|---|---|---|---|---|
| | 0.1 C (mAh/g) | 5 C (mAh/g) | Formation | Cycling |
| 12 | 166 | 112 | — | — |
| 13 | 164 | 108 | 0.23 | — |

What is claimed is:

1. A coated particle comprising a lithium titanate particle core encased by a polyimide coating, wherein the weight percent of the polyimide coating is in the range of 0.1% to 5% based on the total weight of the coated particle, wherein the polyimide coating is either:

covalently bound to lithium and/or titanium on a surface of the lithium titanate particle core; or derived from imidization of a polyamic acid precursor on a surface of the lithium titanate particle core.

2. The coated particle of claim 1 wherein the weight percent of the polyimide coating is in the range of 0.2% to 3% based on the total weight of the coated particle.

3. The coated particle of claim 1 wherein the weight percent of the polyimide coating is in the range of 0.3% to 2.0% based on the total weight of the coated particle.

4. The coated particle of claim 1 wherein a plurality of the coated particles has a volume median particle size in the range of 0.1 μm to 100 μm.

5. The coated particle of claim 1 wherein the polyimide coating is derived from imidization of a polyamic acid precursor on a surface of the lithium titanate particle core, and the polyamic acid precursor is derived by polymerization of pyromellitic dianhydride and oxydianiline monomers.

6. An electrode comprising the plurality of coated particles of claim 4.

7. The electrode of claim 6 further comprising a binder, a conductivity agent, or a combination thereof.

8. A lithium ion battery comprising an anode, a cathode, a separator and an electrolyte wherein the anode comprises the electrode of claim 6.

9. A lithium ion battery comprising an anode, a cathode, a separator and an electrolyte wherein the anode comprises the plurality of coated particles of claim 4.

10. The coated particle of claim 2 wherein a plurality of the coated particles has a volume median particle size in the range of 0.1 μm to 100 μm.

11. The coated particle of claim 2 wherein the polyimide coating is derived from imidization of a polyamic acid precursor on a surface of the lithium titanate particle core, and the polyamic acid precursor is derived by polymerization of pyromellitic dianhydride and oxydianiline monomers.

12. The coated particle of claim 3 wherein a plurality of the coated particles has a volume median particle size in the range of 0.1 μm to 100 μm.

13. The coated particle of claim 3 wherein the polyimide coating is derived from imidization of a polyamic acid precursor on a surface of the lithium titanate particle core, and the polyamic acid precursor is derived by polymerization of pyromellitic dianhydride and oxydianiline monomers.

14. The electrode of claim 6 wherein the weight percent of the polyimide coating is in the range of 0.2% to 3% based on the total weight of the coated particle.

15. The electrode of claim 6 wherein the weight percent of the polyimide coating is in the range of 0.3% to 2.0% based on the total weight of the coated particle.

16. The electrode of claim 14 wherein the polyimide coating is derived from imidization of a polyamic acid precursor on a surface of the lithium titanate particle core, and the polyamic acid precursor is derived by polymerization of pyromellitic dianhydride and oxydianiline monomers.

17. The electrode of claim 15 wherein the polyimide coating is derived from imidization of a polyamic acid precursor on a surface of the lithium titanate particle core, and the polyamic acid precursor is derived by polymerization of pyromellitic dianhydride and oxydianiline monomers.

18. The battery of claim 9 wherein the weight percent of the polyimide coating is in the range of 0.2% to 3% based on the total weight of the coated particle.

19. The battery of claim 9 wherein the weight percent of the polyimide coating is in the range of 0.3% to 2.0% based on the total weight of the coated particle.

20. The battery of claim 18 wherein the polyimide coating is derived from imidization of a polyamic acid precursor on a surface of the lithium titanate particle core, and the polyamic acid precursor is derived by polymerization of pyromellitic dianhydride and oxydianiline monomers.

* * * * *